(12) United States Patent
Acker et al.

(10) Patent No.: US 8,608,830 B2
(45) Date of Patent: Dec. 17, 2013

(54) VALVE, SEPARATION SYSTEM, AND METHOD FOR MINIMIZING WEAR

(75) Inventors: Matthew W. Acker, Des Plaines, IL (US); Jeffrey M. Borek, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 773 days.

(21) Appl. No.: 12/704,728

(22) Filed: Feb. 12, 2010

(65) Prior Publication Data
US 2011/0197769 A1    Aug. 18, 2011

(51) Int. Cl.
*B01D 59/26* (2006.01)

(52) U.S. Cl.
USPC .. 95/96; 95/148; 96/130; 96/143; 137/625.46

(58) Field of Classification Search
USPC .................. 95/96, 103, 148; 96/130, 143; 137/625.46
See application file for complete search history.

(56) References Cited

U.S. PATENT DOCUMENTS

| | | |
|---|---|---|
| 2,985,589 A | 5/1961 | Broughton et al. |
| 3,040,777 A | 6/1962 | Carson et al. |
| 4,633,904 A | 1/1987 | Schumann et al. |
| 6,471,859 B1 | 10/2002 | Ogawa |
| 6,500,342 B1 | 12/2002 | Ogawa et al. |
| 6,712,962 B2 | 3/2004 | Sugimoto et al. |
| 7,141,949 B2 * | 11/2006 | Harwood ................. 318/400.35 |
| 8,210,205 B2 * | 7/2012 | Michaels ................. 137/625.46 |
| 2005/0230297 A1 | 10/2005 | Ogawa |

FOREIGN PATENT DOCUMENTS

CN          201283233 Y      8/2009

OTHER PUBLICATIONS

Compax3 Servo Drive/Controller, Parker Automation, Publisher: Parker Hannifin Corporation, May 2008, 16 pages.
Extreme Force Electromechanical Cylinder Series XFC, Parker Catalog, Publisher: Parker Hannifin Corporation, Dec. 2007, 31 pages.

* cited by examiner

*Primary Examiner* — Robert A Hopkins
(74) *Attorney, Agent, or Firm* — Mark R Willis

(57) ABSTRACT

One exemplary embodiment can be a method of minimizing wear of a rotary valve. The method can include regulating a velocity of the rotary valve having a controller for communicating one or more fluids to and from an adsorption zone.

12 Claims, 4 Drawing Sheets

VALVE, SEPARATION SYSTEM, AND METHOD FOR MINIMIZING WEAR

FIELD OF THE INVENTION

This invention generally relates to a valve, and more particularly, a method of minimizing wear thereof.

DESCRIPTION OF THE RELATED ART

Often, a rotary valve may be utilized in separation units. A rotary valve can include several components, such as a rotor and a seal. Typically, the seal may have a lifespan of about 3- about 5 years, which may be effected by indexing the valve. Particularly, a constant velocity can be used to alter the rotor position, which may cause a great deal of wear to the seal. Usually, such rotary valves utilize a hydraulic cylinder that can have no ability to control the speed of the cylinder during operation. Often, the cylinder may be extended at a constant speed, and does not allow velocity adjustments during positioning of the rotor. Moreover, such valves typically fail to have any feedback or alarm to determine if excessive force is being utilized to index the valve, thus potentially damaging the seal. Thus, it would be beneficial to provide a control mechanism to index the rotary valve at a variable velocity to minimize wear.

SUMMARY OF THE INVENTION

One exemplary embodiment can be a method of minimizing wear of a rotary valve. The method can include regulating a velocity of the rotary valve having a controller for communicating one or more fluids to and from an adsorption zone.

Another exemplary embodiment may be a rotary valve for communicating one or more fluids to and from an adsorption zone. The rotary valve may include a seal, a shaft, a controller, and a motor. The motor can include a sensor communicating a motor velocity to the controller for regulating the motor velocity.

Yet a further exemplary embodiment can be a separation system. The separation system can include an adsorption zone and a valve. The valve may include a seal, a shaft, a controller, and a motor. A motor velocity may be communicated to the controller.

Generally, uniform motor velocity during indexing of a valve is identified as a cause of rotor and/or seal damage. Thus, the embodiments disclosed herein can use a controller to provide a variable velocity profile that can be applied when positioning the rotor. Particularly, a variable velocity profile can allow for reduction of the indexing speed should cavitation of the process fluid result. In such an instance, reducing the speed of the valve, and hence the cavitation, can lower the stress applied to the rotor and seal and reduce the dynamic forces and wear. Such a variable velocity profile can be implemented using an electromechanical cylinder. Furthermore, the warning signals may be emitted if excessive force is used to index the valve. As such, an electromechanical cylinder utilizing a servomotor and electricity can have a suitable feedback mechanism.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "adsorption" may also relate to other processes, such as absorption.

DETAILED DESCRIPTION

Figure 1:
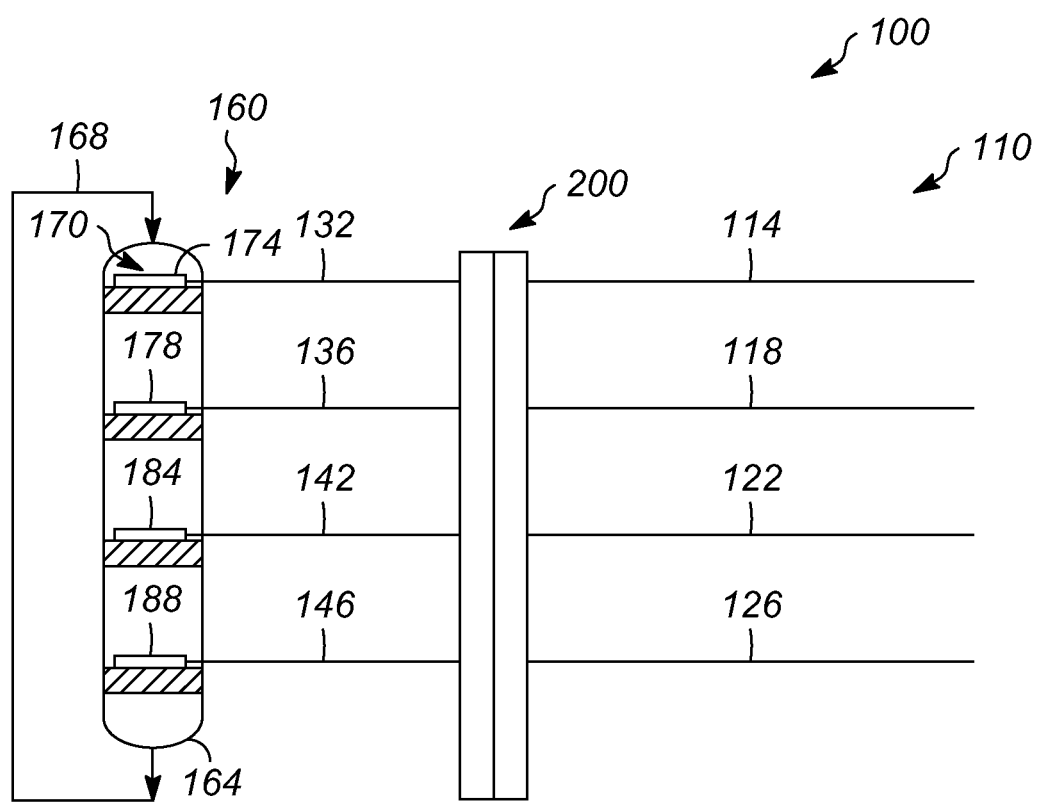
FIG. 1 is a schematic depiction of an exemplary separation system.

Referring to FIG. 1, an exemplary separation system 100 is depicted. The exemplary separation system 100 can include a plurality of lines 110, an adsorption zone 160, and a rotary valve 200. The rotary valve 200 is depicted schematically and not to scale. Generally, lines 114, 118, 122, and 126 can communicate with the rotary valve 200, which in turn communicates with the adsorption zone 160 via lines 132, 136, 142, and 146. Additionally, the adsorption zone 160 can include an adsorber 164 with at least one bed 170, namely a first bed 174, a second bed 178, a third bed 184, and a fourth bed 188. Typically, the adsorption zone 160 is a simulated moving bed and can have a line 168 carrying material from the bottom of the adsorber 164 to the top to facilitate operations. Usually, the lines 114, 118, 122, and 126 can bring a feed or a desorbent, and remove a product and a raffinate from the rotary valve 200. Similarly, the lines 132, 136, 142, and 146 can provide a feed or an adsorbent to the at least one bed 170 and remove a product and a raffinate from the at least one bed 170. Usually, each bed 174, 178, 184, and 188 contains an adsorbent for removing a hydrocarbon compound.

The separation system 100 can be used for separating normal alcohols from branch or cyclic alcohols, separating normal or straight chain aliphatic hydrocarbons from branch chain paraffins and olefins, separating straight chain aldehydes containing at least four carbon atoms per molecule from branch chains and cyclic aldehydes, separating straight chain ketones from branch chain ketones, separating straight chain aliphatic acids from branch chain or cyclic acids, and separating oleic acid from its branch chain isomers. Such an exemplary system using an adsorption zone and a rotary valve is disclosed in, e.g., U.S. Pat. No. 2,985,589. Typically, the adsorbent chosen depends on the type of hydrocarbon desiring to be separated.

Figure 2:
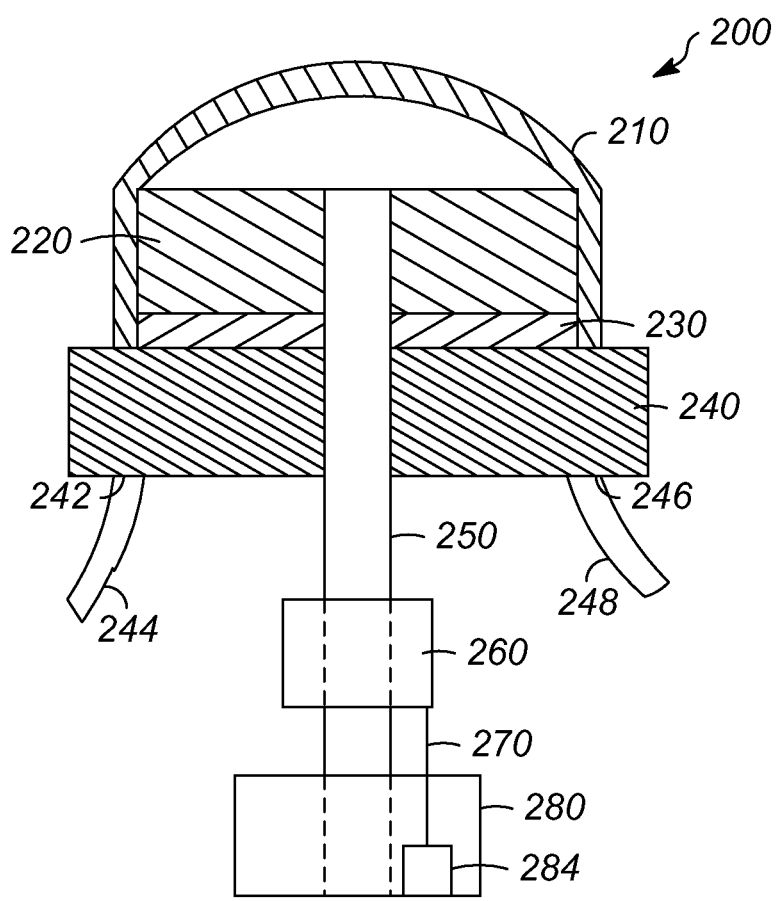
FIG. 2 is a cross-sectional view of a rotary valve with a portion of a shaft depicted in phantom.

Referring to FIG. 2, an exemplary rotary valve 200 is depicted in further detail. Generally, the rotary valve 200 can include a casing 210, a rotor 220, a seal 230, a stator 240, a shaft 250, a controller 260, a communication link 270, a motor 280, and a sensor 284. Typically, the rotor 220 can include a series of passageways to communicate various fluids to and from a zone, such as the adsorption zone 160. The fluid can flow to and from the rotary valve 200 via the lines 244 and 248 communicating with, respectively, a first port 242 and a second port 246. Usually, the rotor 220 can form a series of passageways that can permit various fluids to pass through the rotary valve 200 by rotating the rotor 220. Although two ports 242 and 246 are depicted, additional ports may be present depending on the number of fluids being communicated to a zone. Generally, the rotor 220 and the stator 240 can form a plurality of slots, openings, or passageways that can communicate with a plurality of ports 242 and 246. The angular rotation of the rotor 220 can communicate one inlet port to one outlet port. Particularly, the plurality of ports 242 and 246 are spaced such that the angular rotation of the rotor 220 can connect a different combination of inlet ports with different combinations of outlet ports to allow the exchange of different fluids from the rotary valve 200 to the adsorption zone 160. Exemplary rotary valves depicting the passages through a rotor are disclosed in, e.g., U.S. Pat. No. 3,040,777 and U.S. Pat. No. 4,633,904.

Generally, the controller 260 can be any suitable controller, but preferably is a servo drive. Particularly, a servo drive can receive a command signal from a control system, amplify the signal and transmit electrical current in order to produce motion proportional to the command signal. Typically, the command signal represents a desired velocity, but it can also represent a desired torque or position. A sensor 284, such as a velocity sensor 284, attached to the motor 280 can report the actual velocity back to the servo drive or controller 260. The servo drive 260 can then compare the actual motor velocity with the commanded motor velocity. As such, the controller 260 may alter the voltage velocity to the motor 280 to correct any error in motor velocity. The motor 280 can rotate at a velocity that very closely approximates the velocity signal being received by the servo drive 260 from the motor 280. Several parameters such as stiffness, also known as proportional gain, damping, also known as derivative gain, and feedback gain, can be adjusted to achieve the desired performance.

The controller 260 can be preprogrammed to work with an existing control system. Once the controller is hooked up to a control system and power supply it may be ready to use. Suitable controllers can be obtained from any suitable supplier. Although a circular rotor 220 is depicted, it should be understood that other configurations could be used as well.

Figure 3:
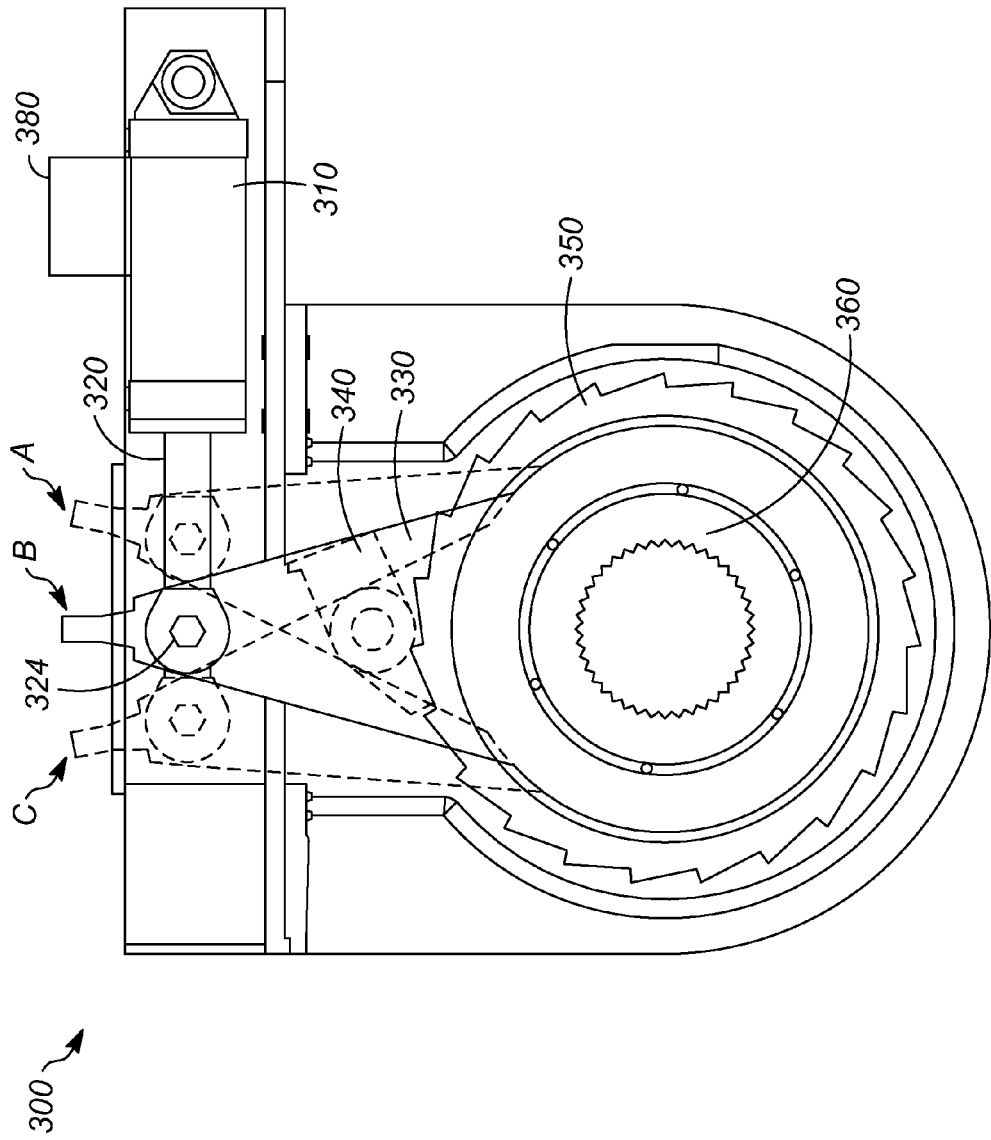
FIG. 3 is a top, plan schematic view of another rotary valve with a pawl and positions A and C of the ratchet arm in phantom.

Referring to FIG. 3, another rotary valve 300 may include a cylinder 310, a ratchet arm 330, a pawl 340, a gear 350, a cap 360, and a servomotor 380. Generally, the cylinder 310 includes a shaft 320 coupled to the ratchet arm 330 with a bolt 324. The cylinder 310 via the servomotor 380 can extend and retract the shaft 320 into three positions, namely a first position or fully refracted position A, a second position or middle position B, and a third position or fully extended position C. The extension and retraction of the shaft 320 can index the ratchet arm 330 to communicate various passageways formed underneath the cap 360. Thus, each position A, B, and C can communicate different combinations of passageways. As the shaft 320 is extended from position A to position C, the pawl 340 can engage the gear 350 to secure the position of the cap 360. When retracting the shaft 320, the pawl 340 can disengage the gear 350 to allow retracting of the shaft 320 and rotation of the cap 360. The servomotor 380 can be a combination of a motor and controller with the controller providing feedback to the motor regarding a velocity of extending and retracting the shaft 320, and thus can minimize wear to the rotor and/or one or more seals housed within the valve 300. The electromechanical cylinder 310 and the servomotor 380 can be obtained from any suitable supplier.

Use of an electromechanical cylinder and a servo motor with adequate capacity can generate the necessary force to index a rotary valve and a position controller with defined or customary velocity profiles. In addition, although in one preferred embodiment the motor 280 is an electric servomotor, it should be understood that any suitable mechanism may be used to power the motor, such as a hydraulic motor. A rotary valve utilizing a hydraulic cylinder may be modified to mount an electromechanical cylinder and a servomotor. Although the rotary valves 200 and 300 have been depicted, it should be understood that the embodiments disclosed herein can be applicable to other valves that communicate a plurality of streams to and from a zone via a plurality of passageways.

Figure 4:
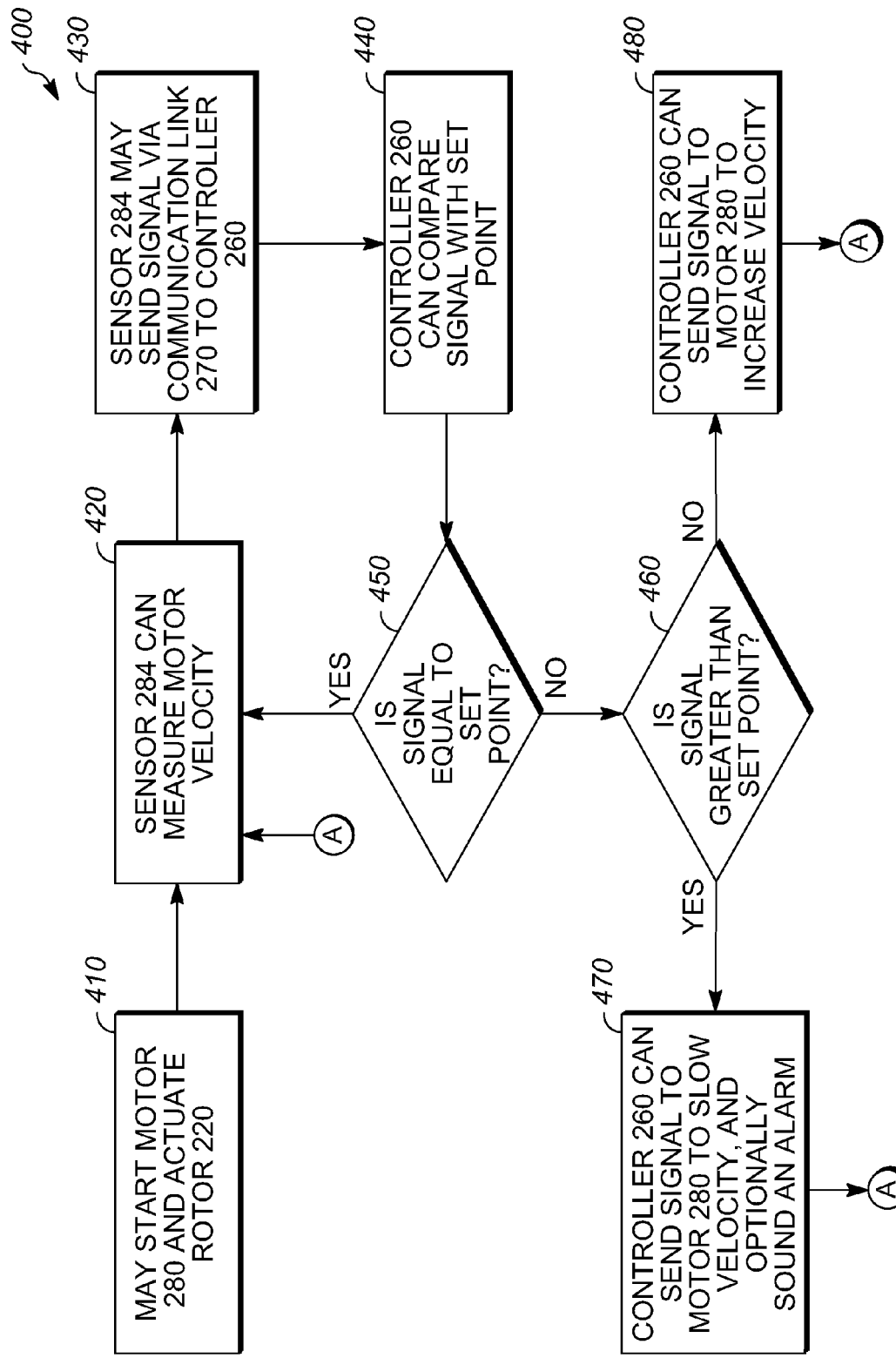
FIG. 4 is a block flow diagram of an exemplary mode of operation of a control system.

Referring to FIG. 4, an exemplary control system 400 is depicted for the rotary valve 200. Referring to FIGS. 2 and 4, in one exemplary mode of operation, the motor 280 can be started and actuate the rotor 220 at a block 410. At a block 420, the sensor 284 can measure the motor velocity. Afterwards, the sensor 284 may send a signal via a communication link 270 to a controller 260 at a block 430. That being done, the controller 260 can compare a signal with a set point in a block 440.

Next, a determination can be made whether the signal is equal to the set point at a diamond 450. If "yes", then the control system 400 can return to the block 420 where the sensor can measure the motor velocity. If "no", then it can be determined whether the signal is greater than the set point at a diamond 460. If "yes", the controller 260 may send a signal to the motor 280 to slow the velocity, and optionally, sound an alarm depending on an alarm set point at a block 470. In some preferred embodiments, the alarm set point may have a delay before sounding depending on the signal intensity. Afterwards, the control system 400 can return to the block 420 at "A". If the answer is "no" at the diamond 460, the controller 260 may send a signal to the motor 280 to increase velocity at a block 480. Finally, the control system 400 can return to the block 420 at "A". Although a mode of operation has been described for the rotary valve 200, it should be understood that the mode can be modified for application to other valves, such as the rotary valve 300.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of minimizing wear of a rotary valve, comprising:
regulating a velocity of the rotary valve comprising a controller for communicating one or more fluids to and from an adsorption zone, wherein the rotary valve comprises
A) a cylinder;
B) a shaft;
C) a ratchet arm; wherein the cylinder comprises the shaft coupled to the ratchet arm with a bolt;
D) a servomotor, the servomotor extending and retracting the shaft into one or more positions, the servomotor comprising:
i) a motor;
ii) a sensor; and iii) a controller, the controller providing feedback to the motor for regulating velocity of extending and retracting the shaft;

the sensor communicating the velocity of the motor to the controller, for regulating the velocity of extending and retracting the shaft.

2. The method according to claim 1, wherein regulating the velocity of extending and retracting the shaft comprises comparing the velocity with a set point.

3. The method according to claim 2, wherein the controller communicates a signal to the motor.

4. The method according to claim 1, wherein the rotary valve further comprises a rotor and a seal.

5. The method according to claim 4, wherein regulating the velocity of the rotor minimizes wear of the rotor and seal.

6. The method according to claim 1, wherein the rotary valve distributes a feed or a desorbent to the adsorption zone.

7. The method according to claim 1, wherein the rotary valve distributes a raffinate or an extract from the adsorption zone.

8. The method according to claim 1, wherein the adsorption zone selectively retains one or more hydrocarbons.

9. A rotary valve for communicating one or more fluids to and from an adsorption zone, comprising:

A) a cylinder;
B) a shaft;
C) a ratchet arm; wherein the cylinder comprises the shaft coupled to the ratchet arm with a bolt;
D) a servomotor, the servomotor extending and retracting the shaft into one or more positions, the servomotor comprising:
 i) a motor; and
 ii) a controller, the controller providing feedback to the motor for regulating velocity of extending and retracting the shaft.

10. The rotary valve for communicating one or more fluids to and from an adsorption zone according to claim 9, wherein the adsorption zone comprises an adsorber containing at least one bed.

11. The rotary valve for communicating one or more fluids to and from an adsorption zone according to claim 9, wherein the valve distributes a feed or a desorbent to and a raffinate or an extract from the adsorption zone.

12. The rotary valve for communicating one or more fluids to and from an adsorption zone according to claim 9, wherein the adsorption zone selectively retains one or more hydrocarbons on an adsorbent.

* * * * *